March 12, 1940.  J. H. HOGAN  2,193,457
METHOD AND APPARATUS FOR HANDLING EXPOSED FILM SHEET IN PHOTOENGRAVING WORK
Filed Sept. 28, 1938  4 Sheets-Sheet 1

INVENTOR
JOHN H. HOGAN
BY Gustave R. Thompson
ATTORNEY

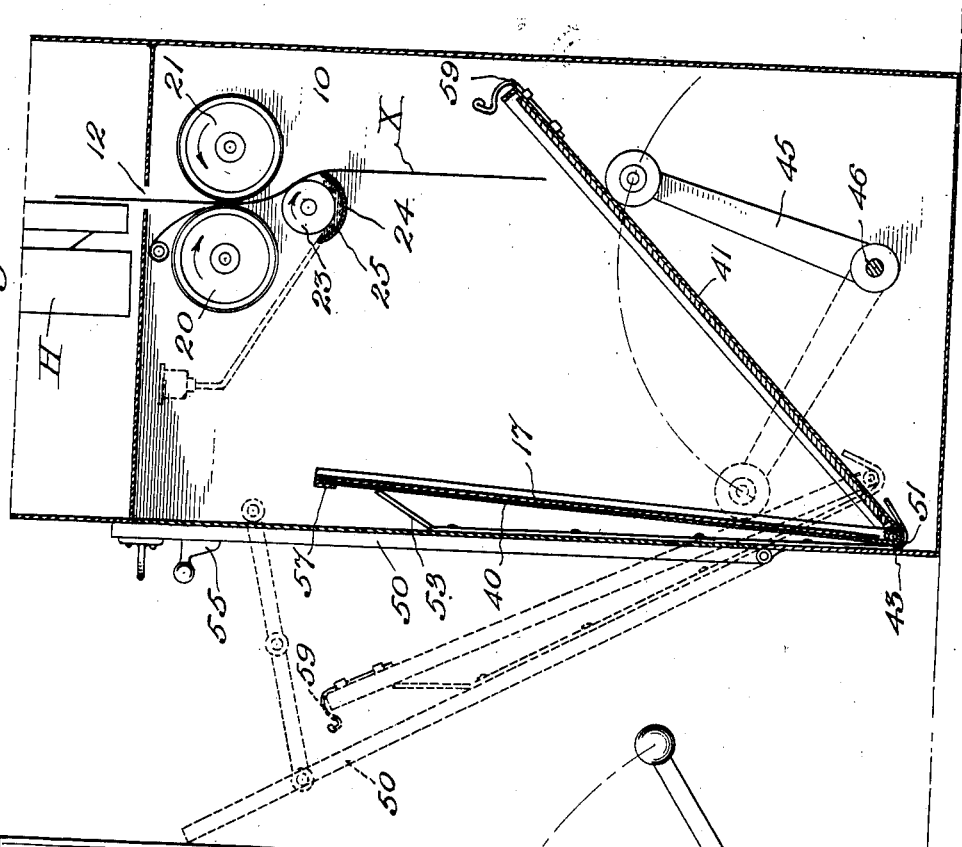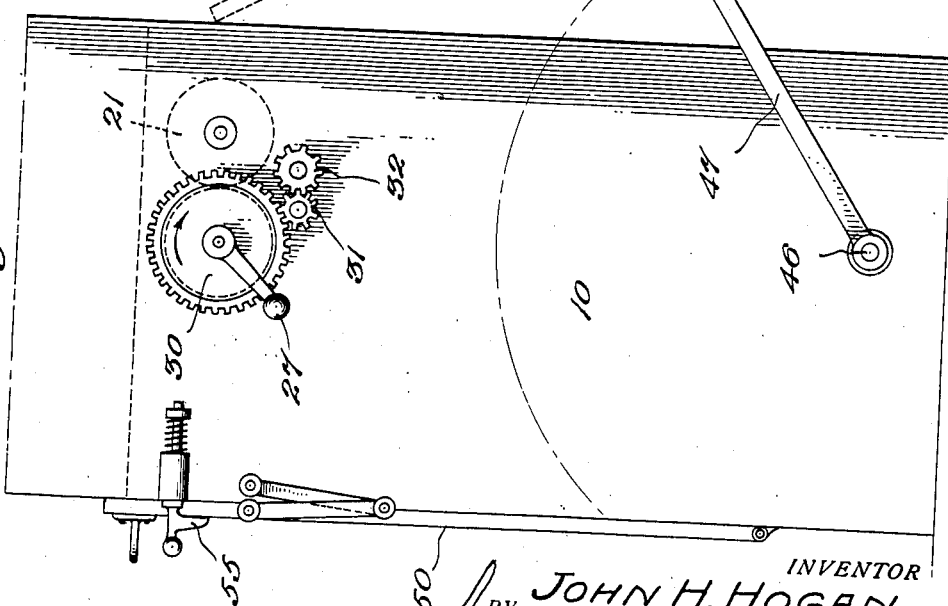

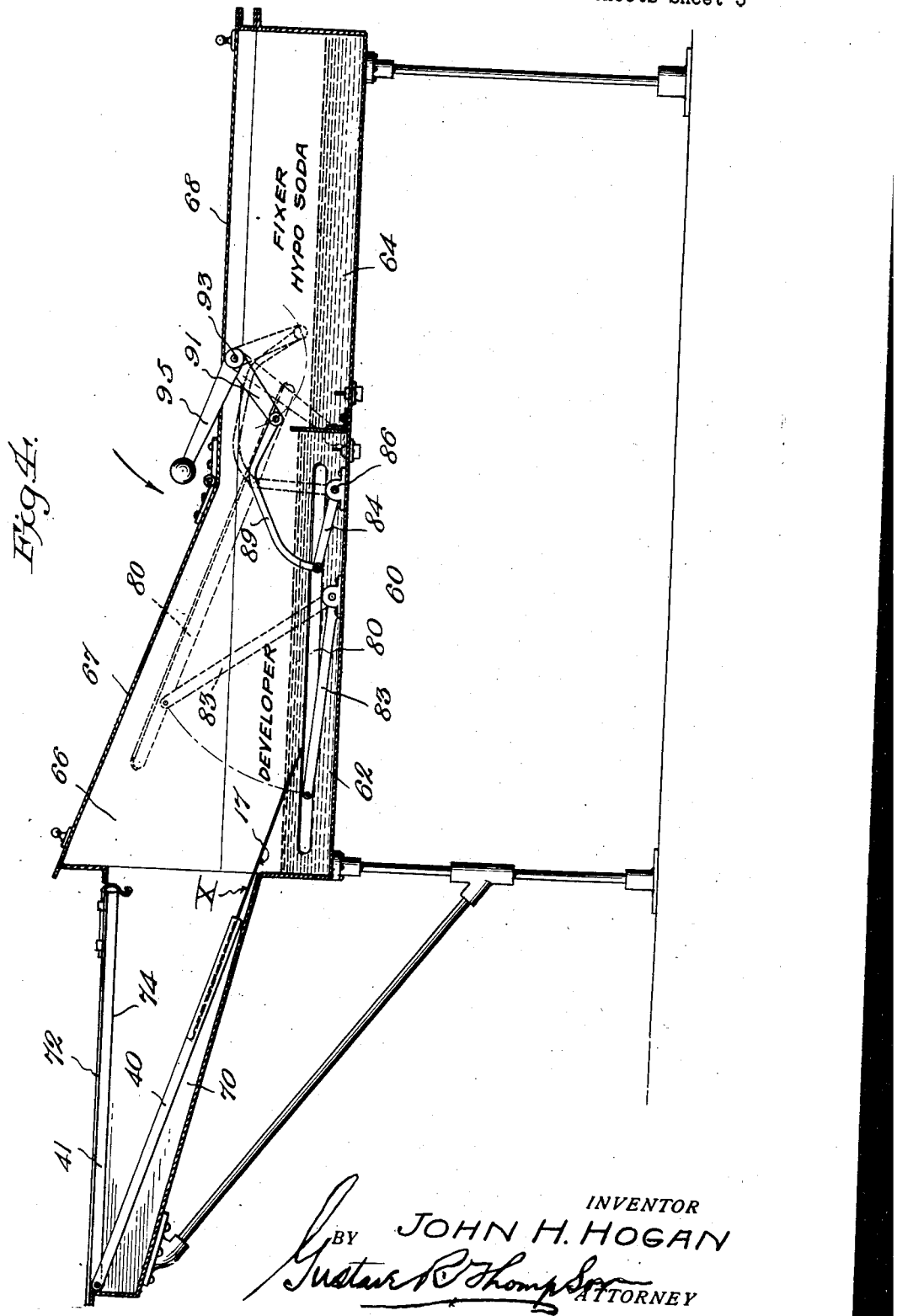

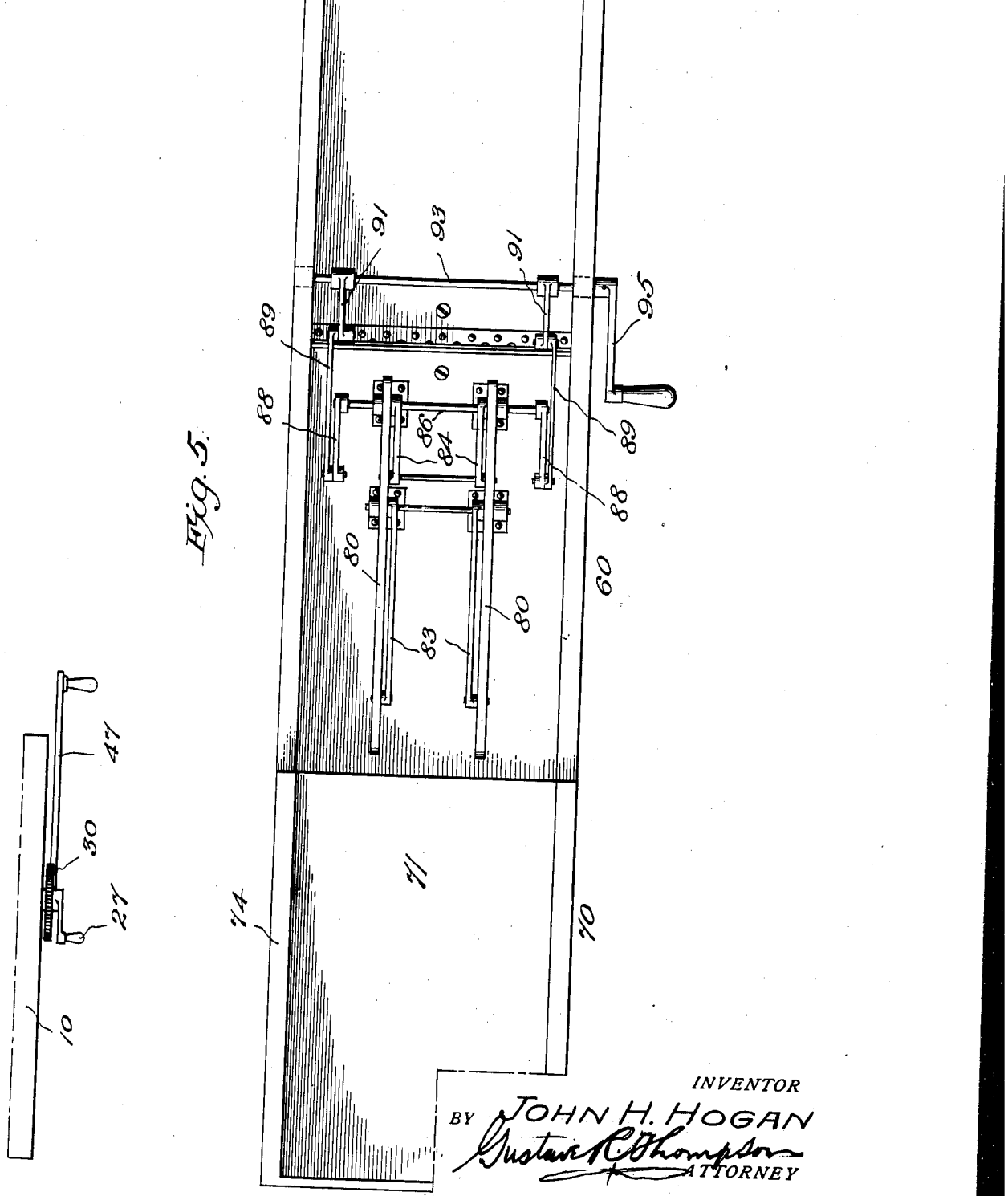

Patented Mar. 12, 1940

2,193,457

UNITED STATES PATENT OFFICE 2,193,457

METHOD AND APPARATUS FOR HANDLING EXPOSED FILM SHEET IN PHOTOENGRAVING WORK

John H. Hogan, New York, N. Y.

Application September 28, 1938, Serial No. 232,051

14 Claims. (Cl. 95—90)

This invention relates to a method and apparatus for handling photographically exposed film sheet in photoengraving work and provides improvements therein.

Photoengravings are largely used in newspaper production, and speed of production is of the utmost importance. The reason for the importance of speed are explained in my Patent #2,017,096. Speed of production is also of importance in other branches of the printing industry making use of photoengravings. Economy of production is also of importance.

By the present invention I provide a method and apparatus by which the removal of an exposed piece of film sheet, and the development, fixing and stripping of the exposed piece of film may be carried out with great rapidity and economy, and without the necessity of making use of a dark-room. All of the aforesaid operations can be carried out at or adjacent the camera, without the photoengraver having to move very far from the camera or to go into a dark room to produce a completed image-bearing film.

Not only does my invention provide for speed production of photoengravings, but it also effects economies in the production thereof.

An embodiment of the invention is illustrated in the accompanying drawings. The invention may, nevertheless, receive other embodiments than that herein specifically illustrated and described. The method may be carried out with the aid of the apparatus illustrated, and also with the aid of apparatus other than that specifically illustrated.

In said drawings, Fig. 1 illustrates, in side elevation, a camera such as used in newspaper work and in commercial establishments, and embodying the present invention. The photographic camera may be, as shown, similar to that in my patent application Serial No. 99,232.

Fig. 2 is a view in side elevation of a chamber which receives a piece of film-sheet after it has been exposed in the photographic camera and in which its handling according to the present invention begins;

Fig. 3 is a vertical section of the chamber illustrated in Fig. 2;

Fig. 4 is a transverse sectional view through another part of the apparatus in which the exposed piece of film sheet is handled; and Fig. 5 is a top plan view of a part of the apparatus shown in Fig. 4, with the covers removed.

Figure 1:
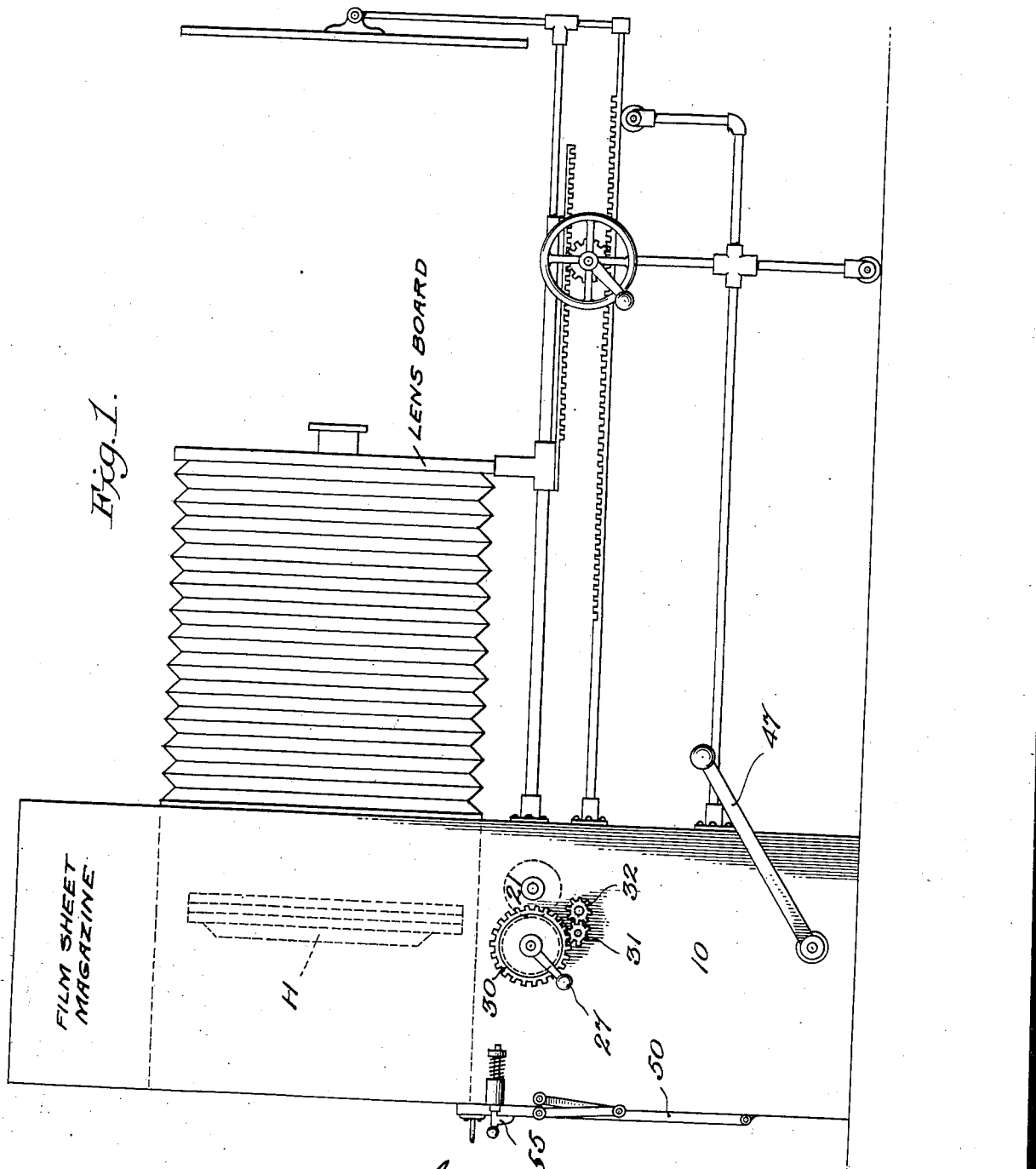

In the production of photoengravings, and especially in newspaper and commercial work, the photographic images are produced on material known as "film sheet." Film sheet is usually supplied in rolls which are mounted in a magazine on the camera, from which the film sheet is unrolled, by suitable means, and guided to a position behind the lens board, where it is exposed to light in the usual way in photography.

To complete the production of a film with the image thereon, a piece of the film sheet which has been exposed is severed from the strip and brought to tanks or trays containing the usual or any suitable developing and fixing solutions. Usually the tanks or trays containing the developing and fixing solutions are contained in a dark room, and the pieces of film sheet are transported from the camera to the dark room in some kind of a lightproof box.

The film sheet is a composite article comprising a relatively thick paper backing, a thin film of transparent or translucent material joined to the film sheet backing, and a coating of sensitized emulsion on the outer face of the film.

For handling photographically exposed pieces of film sheet, I provide a chamber 10 adjacent the photographic camera, for receiving a severed piece of film sheet X. The chamber 10 may be located immediately below the film sheet holder H of the photographic camera, and be provided with a suitable opening or slot 12 through which the piece of film sheet may fall from the face of the film holder H into the chamber 10.

Suitable means 15 are provided in the chamber 10 for uniting the piece of film sheet X to a support 17 of suitable material having sufficient stiffness to prevent the film sheet from curling and to hold it flat in the developing and fixing baths in which it is to be afterwards treated. It also preferably has sufficient weight to readily sink in the developing and fixing solutions. The support 17 may conveniently be a piece of sheet metal.

To hold the piece of film sheet X united to the stiff support 17, a suitable adhesive is applied between the back of the film sheet and the face of the support 17. The adhesive may be applied in various ways. It may be applied to the face of the support 17. Or, as here shown, means may be provided for applying the adhesive to the back of the piece of film sheet X after it leaves the film holder H. To this end I may provide a pair of feed rollers 20, 21 which receives the leading edge of the piece of film sheet X as it leaves the photographic camera and enters the chamber 10, and these feed rollers feed the piece of film sheet X over a roller 23 which rotates in a trough 24 containing a suitable adhesive 25. The feed rollers 20 and 21 and the adhesive-applying roll 23 are so arranged that the roll 23 makes contact with the film sheet backing and applies the adhesive thereto. In practice, after severing the piece of film sheet X and releasing it from the plate holder H, the operator takes hold of a crank 27 on a part of the shaft of feed-roll 20 at the outside of the chamber 10 and turns it, and the turning of the crank 27 rotates the feed roll 20, which latter entrains the rotation of the opposite feed roller 21. The adhesive applying roll 23 is conveniently rotated at the same time through a gear 30 connected with the handle 27, and pinions 31, 32. I have used as an adhesive, dextrose having the consistency of a syrup. There is however a wide choice as to the adhesive.

The means for uniting the piece of film sheet X to the stiff support 17 advantageously comprises a press into which the piece of film sheet X is led, or falls, after entering the chamber 10. The press when the piece of film sheet X is to be transferred through a lighted room, from chamber 10 to a room or apparatus containing developing and fixing solutions, is advantageously in the form of a box or the like 40 having a lid 41. The lid 41 may be hinged to the box 40, as indicated at 43. Suitable means, as an arm 45, may be provided for moving the lid 41 to closed position. The arm 45 may be mounted on a shaft 46 which extends to the exterior of the chamber 10, and has at its outer end a lever 47 or other suitable operating device by means of which the shaft 46 may be turned to move the arm 45 to and from lid closing position. The box 40 is placed in the chamber 10 with the lid 41 in an open position. The box 40 and the open lid 41 are disposed at an angle to receive between them the leading edge of the strip of film sheet X as it is led or falls into the chamber 10. The lid 41 is further arranged at such an angle as to afford a component of support to the film sheet, the angle being such that the leading edge of the piece of film sheet X when it strikes the lid 41 will be guided and led along the surface of the lid 41, and be supported in such a way that it does not buckle when the full length of the piece of film sheet rests on the lid.

After the piece of film sheet X finds support on the inclined lid 41, as aforesaid, the lid may be closed to press the piece of film sheet thereon against the stiff support on plate 17 in the box 40. This closing of the lid 41 may be effected by grasping the handle 47 and giving it a quick movement to cause the arm 45 to turn the lid 41 rapidly to a position parallel with and alongside of the plate 17 in the box 40. With adhesive either on the back of the piece of film sheet X, or upon the face of the stiff-support 17, when the piece of film sheet X on the lid 41 is pressed against the stiff-support 17, the piece of film sheet and the stiff support 17 will be united.

With the piece of film sheet X united to the stiff support 17, the stiff support 17, with the piece of film sheet thereon may be transferred to the developing and fixing solutions in any suitable manner and by any suitable means.

With the press in the form of a box comprising the box proper 40 and the lid 41, as heretofore described, the stiff support 17 with the piece of film sheet thereon may be removed from the chamber 10 and carried or transported through light to the place or apparatus where the developing and fixing is carried out.

For removing the box 40, the chamber 10 may be provided with a hinged door 50, which hinged door may be provided with a stirrup 51 for holding the box in substantially upright position in the chamber 10. A spring 53 may be provided on the door, which bears against the back of the box 40 to provide resilience when the lid 41 is pressed against the stiff support 17 in the box by the action of the arm 45. A latch 55 or other suitable means, may be provided for holding the door 50 in its closed position. When the door 50 is moved to its open position, illustrated in dotted lines, Fig. 3, the box 40 with its closed lid 41, containing the piece of film sheet X united to the stiff support 17 may be readily grasped by the hand in a manner to hold the box and lid closed, and transported to the place or apparatus where the developing and fixing is to be done. The stiff support or plate 17 may be provided with a hook 57 adapted to extend over the edge of the box 40 and thereby hold the plate or support 17 upright in the open position of the box. A latch 59 may be provided on the lid 41 adapted to extend over the edge of the box 40 and thereby hold the lid 41 in closed position on the box.

According to the present invention, the piece of film sheet may be handled in such a way that the developing and fixing may be done adjacent the photographic camera or in the same lighted room with the photographic camera. Thereby the necessity of having, walking to, and working in, a dark room may be avoided.

The method and apparatus for handling the exposed piece of film sheet may accordingly comprise an enclosed tank 60, forming a part of, or adjacent to, the chamber 10 of the photographic camera. The enclosed tank 60 has a part 62 for containing a developing solution and a part 64 for containing a fixing solution. 66 designates a cover having lids 67, 68 which may be opened for observing and replacing the solutions. The lid 68 also is opened for removing the completed image-bearing film.

The tank 60 has a part 70 for receiving the stiff support 17 having the piece of film sheet X united thereto. This part 70, also, as illustrated, may be constructed and arranged to receive the box 40 containing the stiff support 17 with the piece of film sheet thereon, in a manner to admit of the opening of the box and the dropping of the stiff support 17 with the piece of film sheet thereon, into the developing solution without exposing the piece of film sheet to light. To this end, the receiving part 70 of the tank 60 may be provided with an opening 71 of a size and shape to receive the box 40, and to be closed by said box when the box is placed over said opening. The lid 41, may be provided with flanges 72 constructed and arranged to rest on the side portions 74 of the receiving part 70 and to support the lid when over said opening 71.

In placing the box 40 over said opening 71 it is placed with the box part 40 lowermost, and the box is so constructed and arranged that when freed by the hand of the operator or by the latch 59, (when a latch is employed) the box 40 may fall or turn away from the lid 41 which rests on the side portions 74 of the tank enclosure.

The box having been placed over the opening 71 with the box part 40 lowermost, as before described, the operator removes his hand from the edges of the box and lid (or unfastens the latch 59), and allows the box-part 40 to fall. As the box 40 falls, the box is opened, and the plate or stiff support 17 also falls. The box 40 drops to an inclined position, and the stiff support 17 with the piece of film sheet X thereon slides into the part of the tank 62 containing the developing solution. By relation to the preceding part of the apparatus the stiff support 17 rests with its back against the bottom of the box 40 when placed in the opening 71, and the stiff support 17 accordingly slides into the developing solution with the face of the film sheet, i. e. the part coated with the sensitized solution, uppermost. The part of the tank 62 containing the developing solution is advantageously provided with a platform 80, which may be merely a pair of bars, as shown, upon which the stiff support 17 with the piece of film sheet X thereon rests in the solution. The platform 80 is arranged to lie substantially horizontally in its immersed position. Means are provided for raising the platform 80, and for inclining it in raised position. The means for raising and inclining the platform 80, may, as here shown, comprise sets of links 83, 84 of unequal length. One of the sets of links as the links 84 may be fastened on a rock-shaft 86, which rock-shaft 86 may have arms 88 thereon connected through links 89 with rock-arms 91 on a shaft 93 extending at one end to the outside of the tank 60 and having on its outside end a crank 95 or other suitable means for turning the rock-shaft 93.

After the exposed piece of film sheet has been in the developing solution for a suitable length of time, the operator can transfer it to the fixing solution by taking hold of the crank 95 and turning it downward. The crank 95 turns the shaft 93 to move the arms 91 downwardly (counterclockwise) which turning exerts a pull through the links 89, arms 88, and shaft 86 on the links 84 in a direction to raise said links 84. This causes the platform 80 to rise, and, due to the unequal length of the links 83 and 84, the platform 80 tilts as it rises, and in its raised position lies in an inclined position, as shown in dotted lines, Fig. 4. In such inclined position, the stiff support 17 having the piece of film sheet X thereon slides from the platform into the part 64 of the tank containing the fixing solution.

The piece of film sheet X remains in the fixing solution for a suitable length of time to fix the image on the film. While it is in the solution the film also loosens from the film sheet backing, and at this stage is limp and has no tendency to curl.

After the image has been fixed on the film and the film loosened from its backing, the operator lifts the lid 68 and picks up the film, and also removes the stiff support 17 to which the piece of film sheet X was united while being handled in the apparatus. The film sheet backing may then be removed from the stiff support and the stiff support again used in the manner heretofore described. The stiff support acts, as heretofore described, to prevent curling of the film sheet and of the film thereon during the handling, and transports the piece of film sheet through the apparatus and handling steps heretofore described in such manner that the face of the film having the sensitized coating thereon remains uppermost in the developing and fixing baths.

A description of operation has been incorporated in the description of the apparatus.

According to my method, a piece of film sheet X, after it has been exposed in a photographic camera and severed from the strip of film sheet which is fed to the film holder, is united to a stiff support, as a plate of sheet-metal 17. Prior to the union, an adhesive is applied in a manner to unite the paper backing of the film sheet to the face of the stiff support. The adhesive may be so applied either by applying it to the backing of the piece of film sheet after it leaves the film holder in the camera, which has the advantage that it may be applied immediately prior to the union of the piece of film sheet to the stiff support and by simple and convenient apparatus in the course of the movement of the piece of film sheet from the film holder, and the further advantage that the part of the stiff support not covered by the piece of film sheet is free of adhesive, or by applying the adhesive to the face of the stiff-support and handling the piece of film sheet in such manner that the backing of the piece of film sheet comes against the face of the stiff support which bears the adhesive.

After the adhesive has been applied, the piece of film sheet is pressed against the stiff-support, the piece of film sheet and stiff support being so disposed and arranged that the adhesive is between the stiff support and the backing of the piece of film sheet.

The piece of film sheet so united to the stiff support is transferred to a developing solution and then to a fixing solution. The stiff-support prevents curling of the piece of film sheet during handling and treatment in the developing and fixing solution. It also greatly facilitates the handling of the exposed piece of film sheet in mechanical apparatus for transferring, developing and fixing the piece of photographic film. The stiff support, having the exposed piece of film sheet thereon, can slide readily on inclined surfaces, readily submerges in solutions, holds the entire piece of film sheet flatwise beneath the level of the solution, and enables the piece of film sheet to be readily lifted mechanically from one solution and transferred to another.

The present method also provides for the transfer of the stiff support having the photographically exposed piece of film sheet thereon from the chamber in which the pressing or uniting is done to the developing and fixing solutions through a lighted room. In practicing this feature of the method, the pressing together of the stiff support and the exposed piece of film sheet may be carried out in a box having a lid, the box, when the lid is closed, protecting the piece of film sheet from the action of light. The closed box containing the stiff support having the exposed piece of film sheet thereon may then be removed from the dark chamber at which the uniting and pressing is carried out and transferred to a place or apparatus where the developing and fixing is done.

The method, according to the present invention, also provides for the transferring in a lighted room, of the stiff support having the exposed piece of film sheet thereon, from a box containing it to an enclosed tank containing developing and fixing solutions. In practicing this feature of the method, the box is placed over an opening in the enclosed tank containing the developing and fixing solutions in such manner that the box covers the said opening, and in such manner that the innermost part of the box may fall through the opening, and thereby release the stiff support with the piece of film sheet thereon and allow it to fall into the developing solution.

In placing the box over the aforesaid opening in the enclosed tank containing the developing and fixing solutions, the box is preferably placed over said opening in such manner that the face of the film lies uppermost in the box, so that when the box opens and releases the stiff support having the piece of film sheet thereon, the latter falls or is transferred to the developing solution with the stiff support lowermost and the face of the piece of film sheet bearing the sensitized coating lying uppermost in the solution. With the stiff support lying lowermost in a tank, the stiff support having the piece of film sheet thereon may be readily transferred mechanically from one solution to another, as by the mechanical means comprising a platform and the means for elevating it from a horizontal position in the solution to an inclined position above the solution, shown in Figs. 4 and 5 of the drawings. The stiff support having the piece of film sheet thereon when elevated to an inclined position above one solution, readily slides into another solution, entering and lying submerged in the second solution with the parts of the film lying uppermost. By arranging the procedure in such manner that the stiff support with the piece of film sheet thereon is handled with the stiff support lowermost, and the face of the film uppermost, marring of the film is avoided, especially when the handling is done in whole or in part in mechanical apparatus.

While I have shown and described only two tanks, one for the developing solution and another for a fixing solution, it is obvious that additional tanks could be included, as for example, washing tanks, and the stiff support with the exposed piece of film sheet thereon transferred from one tank to any number of others by lifting and transfer means similar to that shown in Figs. 4 and 5.

What is claimed is:

1. Method of handling exposed film sheet in the photoengraving art comprising applying an adhesive on the back of a piece of film sheet in a camera after exposure, said film sheet comprising a backing and an adherent sensitized film, placing the film sheet face downward upon the lid of a box within the camera, closing the lid to bring the back of said piece of film sheet against a support in said box to cause the back of the said piece of film sheet to adhere to said support, moving the box from the camera, and transferring the support with the piece of film sheet thereon from the box to developing and fixing solutions wherein the film is developed and fixed, and becomes readily separable from the film sheet backing.

2. Apparatus for handling exposed film sheet in the photoengraving art, comprising a chamber for receiving a piece of film sheet after exposure in a photographic camera, a box having a lid, adapted to be supported within said chamber, with its lid open, a stiff support in said box, means for delivering the piece of exposed film sheet between the box and its open lid, means for closing the lid of the box to unite said piece of film sheet and said stiff support, an enclosed tank for developing and fixing solutions, having a part for receiving said box and in which the lid of the box may be opened to deliver the stiff support with the piece of film sheet thereon to the solution-containing part of the tank.

3. Apparatus for handling exposed film sheet in the photoengraving art, comprising a chamber for receiving a piece of film sheet after exposure in a photographic camera, a box having a lid, adapted to be supported within said chamber, with its lid open, a stiff support in said box, means for delivering the piece of exposed film sheet between the box and its open lid, means for closing the lid of the box to unite said piece of film sheet and said stiff support, an enclosed tank for developing and fixing solutions, having a part for receiving said box and in which the lid of the box may be opened to deliver the stiff support with the piece of film sheet thereon to the developing solution containing part of the tank, and means for transferring said stiff support having the piece of film sheet thereon to the fixing solution containing part of the tank.

4. Apparatus for handling exposed film sheet in the photoengraving art, comprising a chamber for receiving a piece of film sheet after exposure in a photographic camera, a box, having a lid, adapted to be supported within said chamber, with its lid open, a stiff support in said box, means for applying adhesive to the back of said piece of film sheet, means for delivering said piece of film sheet with adhesive on its back between the box and its open lid, means for closing the lid of the box to bring the back of the film sheet with the adhesive on its back against said stiff support to unite the film sheet and stiff support, an enclosed tank for developing and fixing solutions having a piece for receiving said box and in which the lid of the box may be opened to deliver the stiff-support with the piece of film sheet thereon to the developing solution-containing part of the tank, and means for transferring said stiff support having the piece of film sheet thereon to the fixing solution-containing part of the tank.

5. Apparatus according to claim 2, wherein said part of said tank for receiving said box has an opening which is closed by said box when placed thereon, lid downward, the box and said part of said tank for receiving it, being so constructed and arranged that the stiff-support with the piece of film sheet thereon drops from said box into the solution-containing part of the tank when the lid of the box opens.

6. Apparatus according to claim 2, wherein said part of said tank for receiving said box has an opening which is closed by said box when placed thereon, lid downward, the box and said part of said tank for receiving it, being so constructed and arranged that the stiff-support with the piece of film sheet thereon drops from said box into the solution-containing part of the tank when the lid of the box opens, and said tank further comprising a platform constructed and arranged to occupy a substantialy horizontal submerged position, and on which said stiff support with the piece of film sheet thereon is adapted to rest after dropping from said box, and means for raising said platform to an inclined position from which said stiff-support with the piece of film sheet thereon can slide into another solution-containing part of said tank.

7. Apparatus according to claim 2, further comprising a resilient support for said box.

8. Apparatus according to claim 2, further comprising means for supporting said box in a substantially vertical position, means for supporting said lid in inclined open position in position to receive and guide the leading edge of said piece of film-sheet with the film-sheet backing uppermost, and means for turning said lid from its inclined position to a closed position on said box.

9. Apparatus according to claim 2, further comprising means for supporting said box in a substantially vertical position, means for supporting said lid in inclined open position in position to receive and guide the leading edge of said piece of film sheet with the film sheet backing uppermost, and means for turning said lid from its inclined position to a closed position on said box, and means for retaining said stiff-support in said box in the aforesaid open position of the lid.

10. In apparatus for handling exposed film sheet in the photoengraving art, a chamber for receiving pieces of film sheet after exposure in a photographic camera, means for applying an adhesive to the backing of the film sheet, a stiff support for the film sheet and means for bringing the piece of film sheet against the stiff support to unite them adhesively.

11. In apparatus for handling exposed film sheet in the photoengraving art, a chamber for receiving a piece of film sheet after exposure in a photographic camera, a box having a lid adapted to be supported within said chamber, with its lid open, a stiff support in said box, means for delivering the piece of exposed film sheet between the box and its open lid, and means for closing the lid of the box to unite said piece of film sheet and said stiff support.

12. In apparatus for handling exposed film sheet in the photoengraving art, a chamber for receiving a piece of film sheet after exposure in a photographic camera, a box, having a lid, adapted to be supported within said chamber, with its lid open, a stiff support in said box, means for applying adhesive to the back of said piece of film, means for delivering said piece of film sheet with adhesive on its back between the box and its open lid, and means for closing the lid of the box to bring the back of the film sheet with adhesive on its back against said stiff support to unite the film sheet and stiff support.

13. Apparatus for handling exposed film sheet in the photoengraving art, comprising a chamber connected with a photographic camera for receiving a piece of film sheet after exposure in the camera, a stiff support in said chamber for the piece of film sheet and coextensive therewith and which holds its shape in developing and fixing solutions, so constructed and arranged as to be movable from place to place and carry the piece of film sheet with it, means in said chamber for temporarily fastening said piece of film sheet to said stiff support to hold it from curling in developing and fixing solutions, a tank for developing and fixing solutions, and means for entering said stiff support with the piece of film-sheet thereon into said tank.

14. Apparatus for handling exposed film sheet in the photoengraving art, comprising a chamber connected with a photographic camera for receiving a piece of film-sheet after exposure in the camera, a stiff support in said chamber for the piece of film sheet and coextensive therewith and which holds its shape in developing and fixing solutions, so constructed and arranged as to be movable from place to place and carry the piece of film sheet with it, means in said chamber for temporarily fastening said piece of film sheet to said stiff support to hold it from curling in developing and fixing solutions, a tank for developing and fixing solutions, and means for entering said stiff support with the piece of film sheet thereon into said tank, and means in said tank for transferring said stiff support with the piece of film sheet thereon from one position of immersion to another.

JOHN H. HOGAN.